No. 752,095. Patented February 16, 1904.

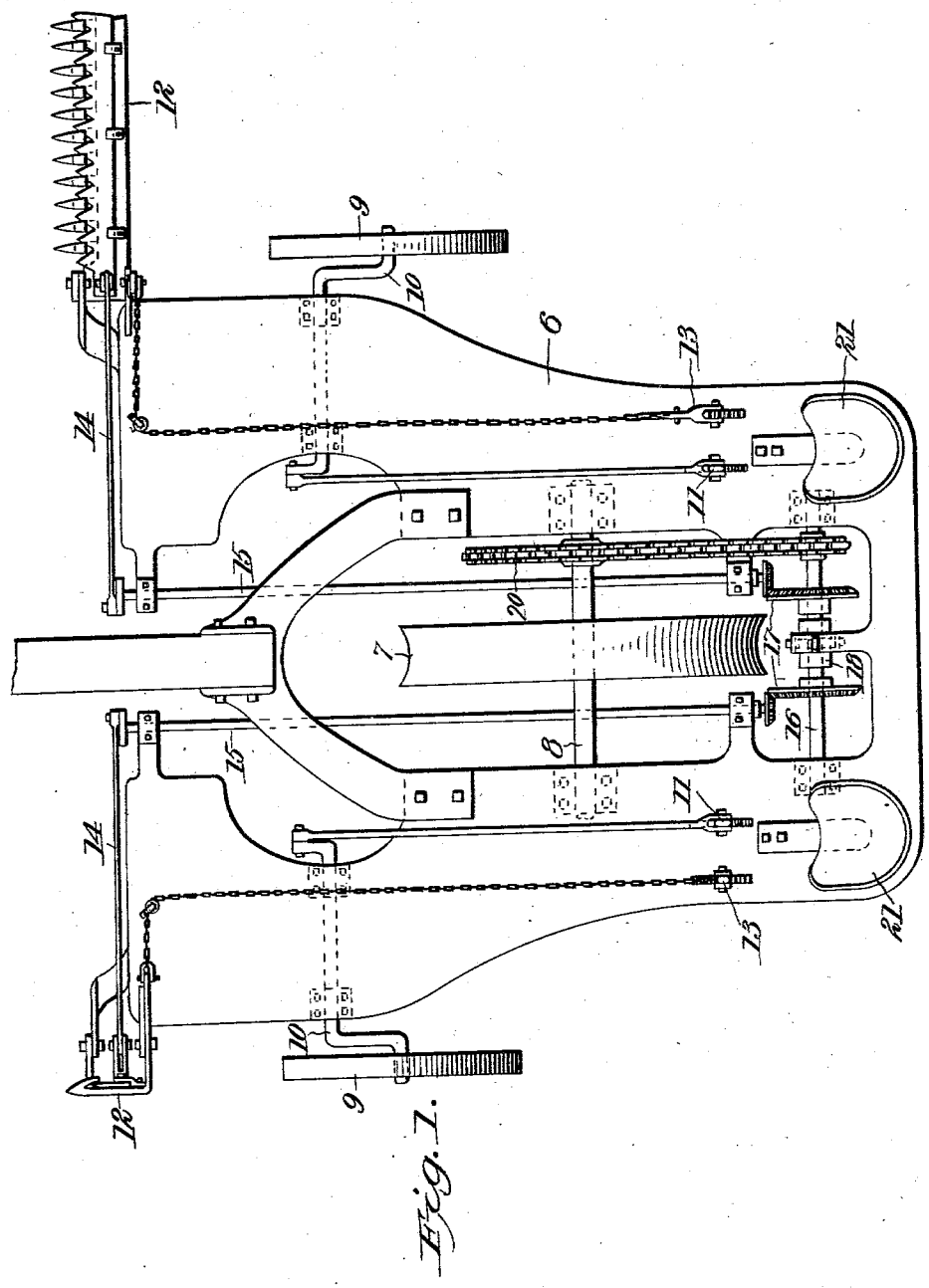

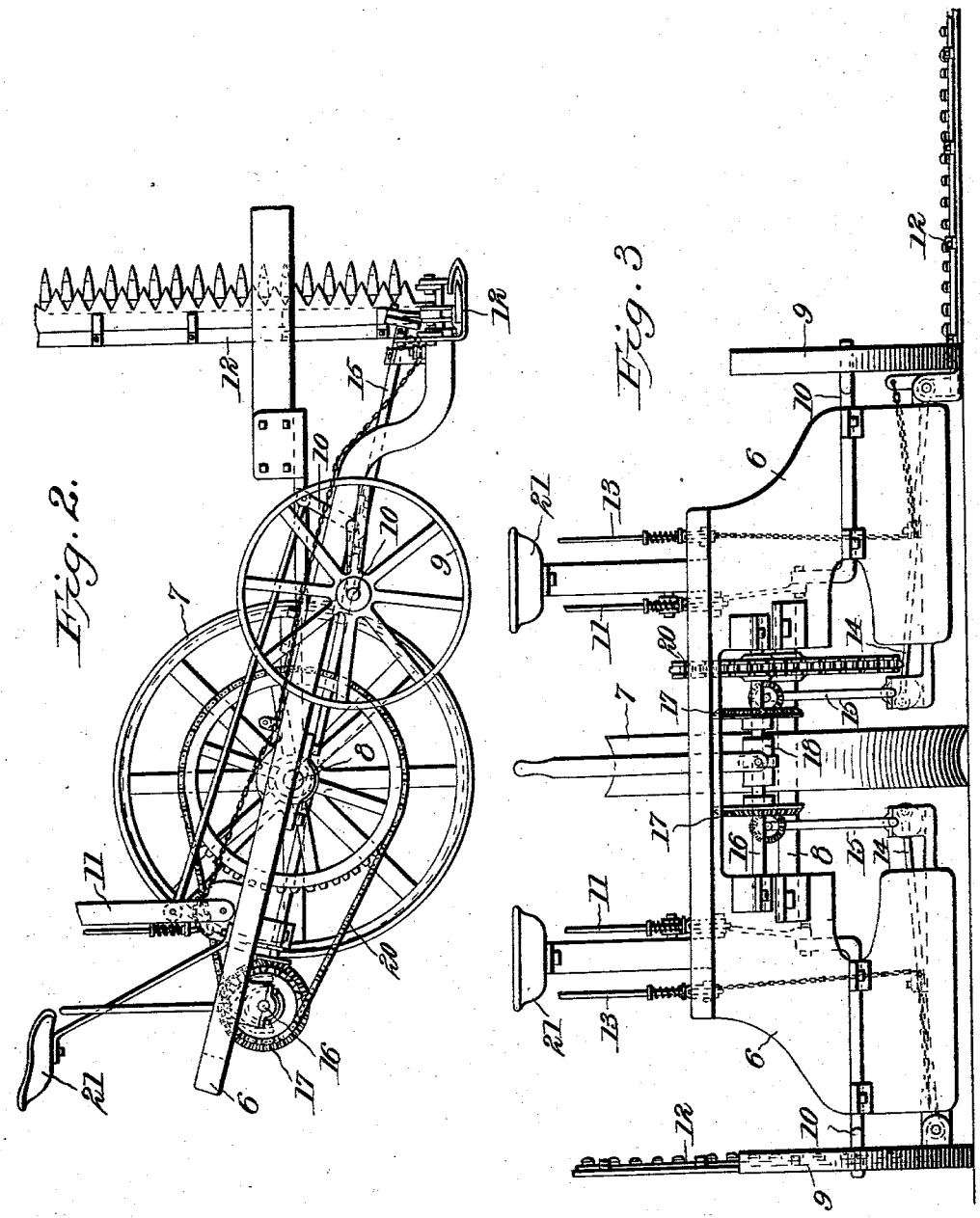

UNITED STATES PATENT OFFICE.

GEORGE WHITE NEWTON, OF CAMBRIA, CALIFORNIA.

MOWING-MACHINE.

SPECIFICATION forming part of Letters Patent No. 752,095, dated February 16, 1904.

Application filed September 30, 1903. Serial No. 175,171. (No model.)

*To all whom it may concern:*

Be it known that I, GEORGE WHITE NEWTON, a citizen of the United States, residing at Cambria, in the county of San Luis Obispo and State of California, have invented new and useful Improvements in Mowing-Machines, of which the following is a specification.

This invention relates particularly to a mowing-machine adapted especially for hillside work, and is characterized by an improved construction producing a reversible mower having two cutter-bars, one on each side, either of which may be thrown in or out of action.

In hillside work to avoid hauling uphill it is desirable that a mower be provided which will cut back and forth across the field and having a cutter-bar on each side, so that when the end of the swath is reached one bar can be raised and the opposite one lowered and the machine drawn back across the field again.

The invention further embodies improved means for leveling the machine, so as to bring the respective cutter-bars in proper position.

Further improvements in construction and operation will be evident from the following description and the accompanying drawings.

In the drawings, Figure 1 is a plan view of the machine. Fig. 2 is a side elevation thereof, and Fig. 3 is a rear elevation.

Speaking generally, the machine comprises a frame supported upon a single master or driving wheel at about the middle thereof and having a leveling-wheel on each side, and said frame carries independent cutter-bars on each side, either of which may be raised or lowered. Driving mechanism between the master-wheel and the cutter-bars is provided, including a clutch to throw either cutter in action.

Referring specifically to the drawings, the main frame is indicated at 6, having at the middle thereof a longitudinal recess, in which a single master or driving wheel 7 is mounted on a shaft 8, carried in suitable bearing-boxes on the frame. The wheel-rim is dished or concaved to prevent side slip and carries most of the weight of the machine, being located at or about the center of weight thereof.

At each side of the machine are light leveling-wheels 9, carried upon the outer ends of cranked axles 10, the inner ends thereof being connected to levers 11, whereby either axle may be turned to raise or lower the respective wheels to the extent made necessary by the slope of the land to keep the platform or frame of the machine in substantially level position.

The cutter-bars are located at 12, one on each side of the machine, and hinged to the frame thereof in the ordinary manner to permit them to be raised or lowered by the lifting-levers 13, the construction being substantially the same as with the ordinary single-bar machines. Each cutter is driven independently by its pitman 14, driven by ordinary crank or crank-disk connection with a shaft 15. These shafts extend lengthwise on each side of the main wheel 7 and are geared to a counter-shaft 16, which extends across at the rear of the machine, by bevel-gears and pinions at 17. The bevel-gears are preferably loose on the shaft, and either may be thrown in action by means of a sliding clutch at 18 of any suitable construction.

The shaft 16 is driven from the main shaft by means of a chain belt 20, bent around suitable sprocket-wheels on the respective shafts. Any other form of gearing may be substituted.

The seats are indicated at 21, one at each side of the frame.

In operation in hillside work the machine is leveled up according to the lay of the land by means of the crank-wheels 9, and one cutter-bar is lowered and thrown in gear and the other raised and out of gear, and so the machine is drawn across the field, the operator being seated on the seat on the same side as the active cutter. When the end of the swath is reached, the machine is turned around and the leveling-wheels and cutter-bar reversed and the next swath cut back across the field in the opposite direction. The machine is of course capable of use on level ground in a similar manner and is especially advantageous in windy weather, when the swaths can be cut back and forth on one side of the field to take advantage of the wind, or rather to avoid the disadvantage of the wind blowing the falling grass or grain the wrong way, as frequently happens in four or two side work.

The invention is not limited to the exact construction shown; but modifications may be made within the scope of the following claims without departing from the spirit of the invention.

What I claim as new, and desire to secure by Letters Patent, is—

1. In a mowing-machine, in combination, a wheeled main frame having independent vertical adjustment at each side, to level it, and cutters on opposite sides thereof.

2. In a mowing-machine, in combination, a wheeled main frame having independent vertical adjustment at each side to level it, cutters on opposite sides thereof, and independent driving connections between the cutters and a wheel.

3. In a mowing-machine, in combination, a main frame, supporting-wheels on opposite sides thereof, an independent vertically-adjustable connection between each wheel and the frame, to level the latter, and cutters on opposite sides of the frame.

4. In a mowing-machine, in combination, a main frame, and means to independently vertically adjust the opposite sides thereof to level the same, and an independently-operated cutter-bar on each side of the frame.

5. In a mowing-machine, in combination, a main frame, a main driving-wheel at the middle thereof, independently vertically adjustable leveling-wheels at opposite sides thereof, a cutter-bar at each side of the frame, and means to transmit motion from the driving-wheel to either cutter-bar.

In testimony whereof I have signed my name to this specification in the presence of two subscribing witnesses.

GEORGE WHITE NEWTON.

Witnesses:
JAMES F. STEWART,
P. L. MAGGETTI.